United States Patent
Rowland

(10) Patent No.: US 8,288,955 B2
(45) Date of Patent: Oct. 16, 2012

(54) METHOD AND DEVICE FOR DRIVING A CIRCUIT ELEMENT

(75) Inventor: Barry Rowland, Salo (FI)

(73) Assignee: Nokia Corporation, Espoo (FI)

( * ) Notice: Subject to any disclaimer, the term of this patent is extended or adjusted under 35 U.S.C. 154(b) by 426 days.

(21) Appl. No.: 12/520,886

(22) PCT Filed: Dec. 28, 2006

(86) PCT No.: PCT/IB2006/055045
§ 371 (c)(1),
(2), (4) Date: Jun. 23, 2009

(87) PCT Pub. No.: WO2008/081223
PCT Pub. Date: Jul. 10, 2008

(65) Prior Publication Data
US 2009/0315471 A1 Dec. 24, 2009

(51) Int. Cl.
*H05B 37/02* (2006.01)
*G09G 3/32* (2006.01)
(52) U.S. Cl. ......................... 315/224; 315/291
(58) Field of Classification Search .................. 315/224, 315/185 R, 291, 247; 345/82
See application file for complete search history.

(56) References Cited

U.S. PATENT DOCUMENTS

| 7,202,608 | B2 * | 4/2007 | Robinson et al. | 315/224 |
| 7,312,783 | B2 * | 12/2007 | Oyama | 345/102 |
| 2006/0001381 | A1 | 1/2006 | Robinson et al. | |
| 2006/0082529 | A1 | 4/2006 | Oyama | |

FOREIGN PATENT DOCUMENTS

| CN | 1760721 A | 4/2006 |
| DE | 10236872 A1 | 3/2004 |
| JP | 2006-140438 | 6/2006 |

OTHER PUBLICATIONS

International Search Report and Written Opinion of the International Searching Authority for corresponding PCT Application No. PCT/IB2006/055045, dated Sep. 20, 2007, 10 pages.
Extended Search Report from corresponding European Patent Application No. 06842691.5, dated Jul. 23, 2010, 7 pages.
Office Action from corresponding European Patent Application No. 06842691.5, dated Feb. 10, 2011, 6 pages.
Office Action from corresponding Chinese Patent Application No. 200680056823.X, dated Jun. 2, 2011, 12 pages.

* cited by examiner

*Primary Examiner* — Daniel D Chang
(74) *Attorney, Agent, or Firm* — Harrington & Smith

(57) ABSTRACT

Light emitting diodes (LEDs) are commonly used to backlight liquid crystal display screens for mobile telephones and other display devices. It may be desirable for the LEDs to be gradually dimmed and this can result in noise being emitted by the components of the driving circuit, along with other undesirable effects. A device for driving a circuit element is provided, comprising a voltage source (6, 7, 8) for generating a pulse width modulated (PWM) output voltage signal, a capacitor (9) arranged to filter the PWM output voltage signal; and a switching element (13) characterized in that the switching element (13) is synchronized with the PWM output voltage signal such that when the PWM output voltage signal is at a minimum, the switching element (13) isolates the capacitor (9) and so prevents the capacitor (9) from discharging.

14 Claims, 5 Drawing Sheets

US 8,288,955 B2

METHOD AND DEVICE FOR DRIVING A CIRCUIT ELEMENT

RELATED APPLICATION

This application was originally filed as PCT Application No. PCT/IB2006/055045 filed Dec. 28, 2006.

FIELD OF THE INVENTION

The present invention relates to a device for driving a circuit element, and more particularly to a device for driving a series-connected light emitting diode (LED) string such as that used for, but not limited to, backlighting a liquid crystal display (LCD) screen for a mobile telephone, or other load that causes a significant discharge of an output capacitor of a driving circuit.

BACKGROUND TO THE INVENTION

In mobile phones, a typical application, a battery pack is provided to supply power to the components. However, mobiles phones can contain several sub-circuits which each require unique voltage levels different from those supplied by the battery pack (sometimes higher or lower than the battery voltage, or even negative voltage). Additionally, the battery voltage declines as its stored power is drained. DC-to-DC converters offer a method of generating multiple controlled voltages from a single variable battery voltage, thereby saving space instead of using multiple batteries to supply different parts of the device.

There are many types of DC-to-DC converters available, depending on the particular function required. Two of the most common are a boost converter, which is used to increase the voltage level, and a buck converter, which is used to decrease the voltage level. Both of these are switched-mode converters, which perform the conversion by applying a DC voltage across an inductor or transformer for a period of time (usually in the 100 kHz to 5 MHz range). This causes current to flow through the inductor, or transformer, which stores energy magnetically. The voltage is then switched off thus causing the stored energy to be transferred to the voltage output in a controlled manner. By adjusting the ratio of on/off time, the output voltage can be regulated even as the current demand changes.

FIG. 1 shows a circuit diagram of a simple Boost DC-to-DC converter. The circuit contains a power supply 1, a high frequency switch 2, a diode 3, an inductor 4 and a load resistor 5.

Present technology uses electrolytic, tantalum or ceramic capacitors for output voltage filtering for these kinds of power management application specific integrated circuits (ASIC). The purpose of such capacitors is to store the energy that is output in the form of pulses by the DC/DC converter, and to further smooth the output voltage signal by removing noise and other high frequency elements.

One particular sub-circuit, which requires a unique voltage, is that used to supply power to an LED string, as is generally used to backlight the LCD screen of the mobile telephone. Occasionally the backlights are required to be dimmed, such as when the backlight is switched on or off, or when the light may need to be switched to a lower level for usability or power saving purposes. This can also be utilised with an ambient light sensor. In order to achieve the dimming effect, the output of the DC-to-DC switched-mode converter is modulated using pulse width modulation (PWM). Further, to achieve power saving, the DC-to-DC converter may be disabled, or partially disabled, during the OFF time of the PWM cycle.

FIG. 2 shows a block diagram of a typical circuit that is currently employed to provide power to a dimmable LED string for a backlight. The circuit contains a PWM control signal generator 6, a DC-to-DC switched-mode converter 7 including an enable switch 71, a battery pack 8, an output filter capacitor 9 and an LED string 10.

PWM uses a rectangular wave signal and modulates the pulse width of the rectangular wave signal, such that the ratio between the ON time (the time for which the signal is asserted) and the time period of the signal varies according to the required operation of the LED string. FIG. 3 shows a PWM signal which, when applied as a PWM control signal to the DC-to-DC switched-mode converter 7 and LED string 10, would have the effect of gradually dimming the LED string 10. The figure shows the varying duty cycle 21 and the time period 20.

The PWM signal is applied as a PWM control signal to the DC-to-DC switched-mode converter 7 and controls an integrated enable switch 71 such that the enable switch 71 is closed when the PWM control signal is asserted, and the enable switch 71 is open when the PWM control signal is not asserted. The DC-to-DC switched-mode converter only outputs a converted voltage to the LED string when the enable switch is closed. Therefore, a PWM voltage signal, with the same frequency and modulation as the PWM control signal, is output by the DC-to-DC switched-mode converter. Subsequently the LED string will flicker between emitting light when the PWM output voltage signal is asserted and not emitting light when the PWM output voltage signal is not asserted. If the PWM control signal of FIG. 3 were applied to the DC-to-DC switched-mode converter 7, the LED string 10 would, at first, emit light for the majority of the time period 20 of the PWM control signal. Over time, however, the proportion of the time period 20 for which the LED string 10 emits light gradually decreases. Therefore, if the frequency of the PWM control signal is appropriate, the light emitted by the LED string 10 would be appear, to the human eye, to be getting dimmer.

The frequency, in order that the flickering of the LED string is not detectable, must be above about 50 Hz (e.g. 300 Hz). These frequencies however are in the audible frequency range. Ceramic filtering capacitors tend to display piezoelectric qualities and therefore, when the PWM output voltage signal is at an audible frequency, a buzzing noise is emitted by the capacitor as a result of its continuous deformation and reformation. This noise is not acceptable.

A further problem of the device shown in FIG. 2 is that DC-to-DC switched-mode converters, operating with an inductor, draw the most current when switching on and the filtering capacitor is charged from a discharged, or partially discharged, state. This is particularly important when using PWM modulation, as the circuit is switched on and off a few hundred times every second and thus the increased current requires that the inductor and other components be sized according to the peak currents encountered, and therefore increase the size and price of such components, or increase their operating stress levels.

A further problem of such a circuit is that the extra current causes increased disturbance to the power line that supplies the circuit, possibly resulting in interference with other devices, or the emission of electromagnetic radiation that exceeds regulatory limits.

Similar problems arise in any DC supply technology that is disabled or powered off during the de-asserted state of a PWM signal waveform such that the output voltage is undriven in the OFF state; the voltage on the capacitor is the only determinant for when acoustical noise will be evident. Even in the case where a DC supply is the driving source, the output capacitor voltage fluctuation between the ON and OFF states is the source of the acoustical noise. Depending on whether current limiting is applied on start-up, the capacitor still appears as a very low impedance load when the power supply is re-enabled, which can cause inrush current spikes, as well. If the power supply is current-limited, the increased rise time of the voltage on the output capacitor causes significant non-linearity in the output voltage/current at low duty cycles of the PWM waveform.

One possibility used to overcome the problem of the audible buzzing of the capacitor is the use of tantalum capacitors instead of ceramic capacitors. However, although these have better resonance characteristics, they are also much more expensive and have other drawbacks such as having high effective series resistance (ESR). A further possibility is to modulate the DC current through the LED string, instead of using PWM, though this can lead to a colour change, as white LEDs (which are typically used to backlight colour LCD screens) change colour with the supply current, and the characteristics of LEDs may vary, relative to one another, at currents that are significantly less than, or greater than, the current at which they are characterised.

SUMMARY OF THE INVENTION

The present invention provides a device for driving a circuit element comprising a voltage source for generating a pulse width modulated (PWM) output voltage signal, a capacitor arranged to filter the PWM output voltage signal, and a switching element characterised in that the switching element is synchronised with the PWM output voltage signal such that when the PWM output voltage signal is at a minimum, the switching element isolates the capacitor and so prevents the capacitor from discharging.

Therefore the capacitor is prevented from reforming to its original shape and so no audible buzzing noise is emitted. Furthermore, when the PWM output signal is next at a maximum the capacitor need not be charged and therefore a reduced current is drawn.

Preferably the voltage source for generating the PWM output voltage signal comprises a DC-to-DC switched-mode converter to convert a supplied voltage level into a converted voltage level and the voltage source for generating the PWM output voltage signal further comprises a PWM control signal generator to output a PWM control signal to control the DC-to-DC switched-mode converter.

Preferably, the switching element is controlled by the PWM control signal. This achieves the synchronisation between the switching of the switching element and the PWM output voltage signal.

Preferably the DC-to-DC switched-mode converter comprises a switching element, which is synchronised with the PWM control signal, and controls the output of the DC-to-DC switched-mode converter such that when the enable switch is closed, the DC-to-DC switched-mode converter outputs the converted voltage level, and when the enable switch is open, the DC-to-DC switched-mode converter does not output a voltage.

Preferably the capacitor is configured to filter high frequency elements of the PWM output voltage signal.

Preferably the circuit element comprises a light emitting diode (LED). More preferably the circuit element comprises a plurality of light emitting diodes (LEDs) and the LEDs emit light when the PWM output voltage signal is at a maximum, and do not emit light when the PWM output voltage signal is at a minimum.

Preferably the light emitted by the LEDs illuminates the rear of a liquid crystal display (LCD) screen where the LCD display screen may be a display screen of a mobile telephone.

Preferably the PWM output voltage signal is modulated such that the brightness of the light emitted by the LEDs appears to gradually change. Preferably, the PWM output voltage signal is at a frequency above 20 Hz.

Preferably, the switching element is integrated into a power supply integrated circuit which includes the DC-to-DC converter, such that the switching element provides a connection between an output voltage pin of the DC-to-DC converter, the output filtering capacitor, and a second pin, or pins, that connect to the circuit element.

Optionally the output load switch may be external to the power supply integrated circuit, and comprise two bipolar transistors and appropriate biasing components.

Optionally, the output load switch may be external to the power supply integrated circuit, and comprises two Field Effect Transistors, and required biasing components.

Optionally, the output load switch may be external to the power supply integrated circuit, and comprises a combination of different transistor types, and required biasing components.

Preferably the supplied input voltage level is supplied by a single cell or multiple cell battery pack.

Preferably the output filter capacitor is a ceramic capacitor.

The present invention also provides a method for driving a circuit element, comprising generating a PWM output voltage signal and filtering the PWM output voltage signal using a capacitor, characterised by isolating the capacitor when the PWM output voltage signal is at a minimum using switching element synchronised with the PWM output voltage signal.

BRIEF DESCRIPTION OF THE DRAWINGS

Preferred embodiments of the present invention will now be described, by way of example only, with reference to the accompanying drawings in which.

DETAILED DESCRIPTION

Figure 1:
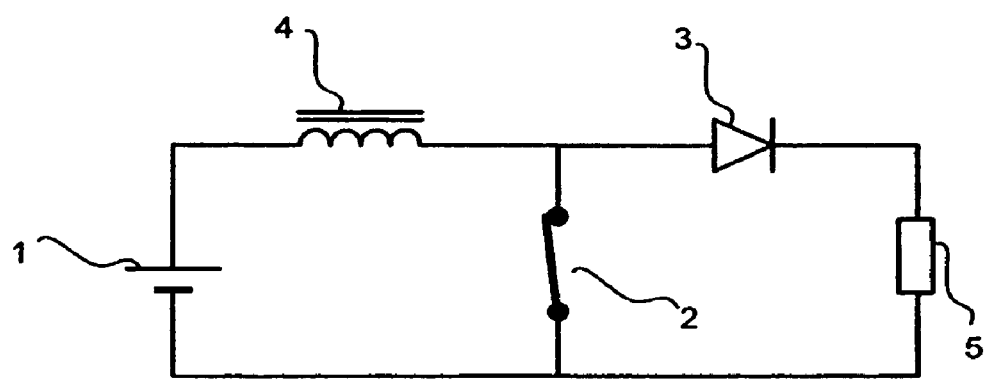
FIG. 1 shows a circuit diagram of a Boost DC-to-DC switched-mode converter.
Figure 2:
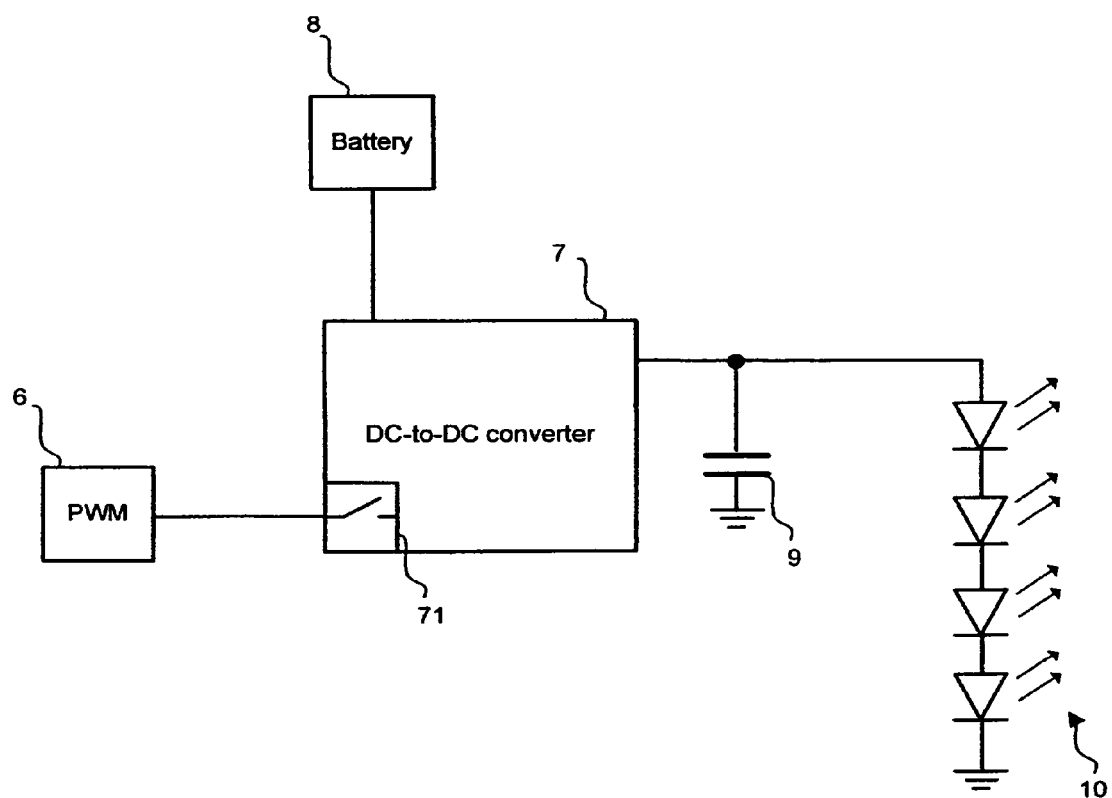
FIG. 2 shows a block diagram of a typical circuit for driving a dimmable LED string for a backlight.
Figure 3:
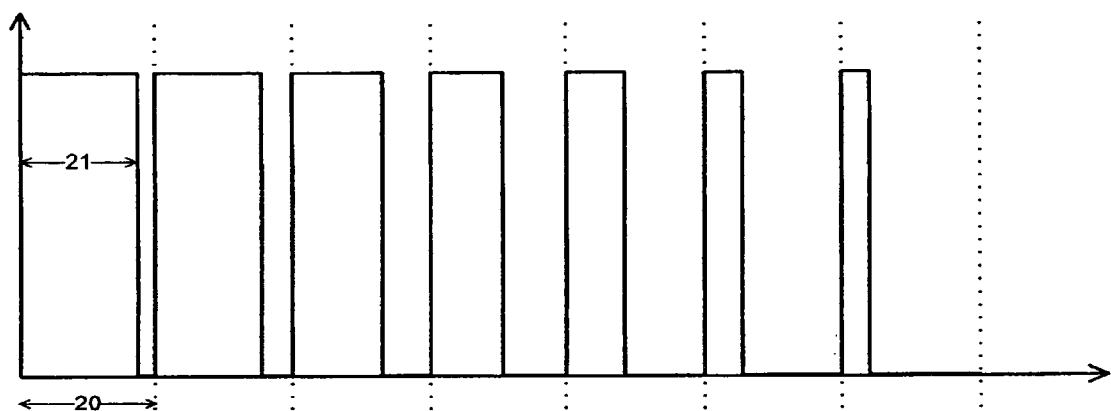
FIG. 3 shows a PWM signal that would be supplied to dim an LED string.

FIG. 2 shows a block diagram of a typical circuit for supplying power to a dimmable LED string for a backlight. The battery pack 8 supplies a DC voltage to a DC-to-DC switched-mode converter 7. The DC-to-DC switched-mode converter 7 converts the DC voltage from the battery pack 8 into a voltage at a different level to that supplied by the battery pack 8. The particular level of the voltage depends on the requirements of the LED string.

The DC-to-DC switched-mode converter 7 includes an enable switch 71. The enable switch controls the operation of the DC-to-DC switched-mode converter 7 such that when the enable switch is closed the DC-to-DC switched-mode converter 7 outputs a converted voltage, and when the enable switch is open the DC-to-DC switched-mode converter 7 does not output a voltage. The PWM control signal generator 6 supplies a pulse width modulated control signal (as shown in FIG. 2) to the enable switch 71 of the DC-to-DC switched-mode converter 7. The PWM control signal, controls the enable switch 71, such that when the PWM signal is at a maximum the enable switch 71 is closed, and when the PWM signal is at a minimum the enable switch 71 is open.

When the PWM signal is at a maximum and the thus the enable switch 71 is closed, a converted voltage is output by the DC-to-DC switched-mode converter 7. Therefore, the DC-to-DC switched-mode converter outputs a PWM voltage signal of the same frequency and modulation as the PWM control signal. The maxima of the PWM output voltage signal are at the converted voltage level. When the PWM output voltage signal is at a maximum a current flows towards both the output capacitor 9, thus charging it, and towards the LED string 10, thus causing the LEDs to emit light. If the current is a perfect DC current, the capacitor 9, once fully charged, is unable to receive more current. However, in reality DC currents always contain high frequency oscillations. Therefore, when the current momentarily drops to a lower level by a small amount, the capacitor 9 releases a comparable amount of the charge stored on its plates and therefore has the effect of smoothing the current that passes through the LED string 10. When the high frequency oscillations in the current cause a momentary increase in the current, the capacitor 9 will recharge.

When the PWM output voltage signal becomes a minimum, meaning that no voltage is being output by the DC-to-DC switched-mode converter 7, the capacitor 9 discharges through the LED string 10. The process repeats according to the PWM output voltage signal.

Ceramic capacitors display piezoelectric qualities and, therefore, when the capacitor is charged, a slight deformation occurs. Upon discharging, the capacitor will return to its original form. The frequency of the PWM output voltage signal is approximately 300 Hz and so the deformation occurs 300 times every second. Because this is in the audible frequency range, a buzzing noise results.

Figure 4:
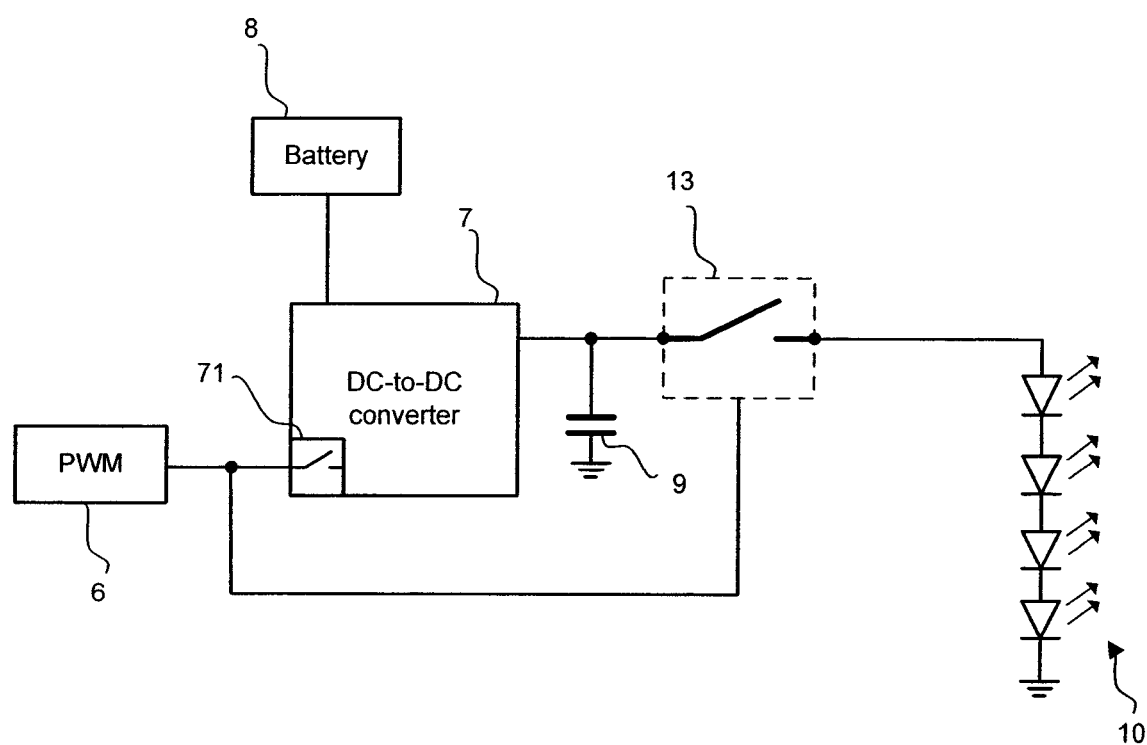
FIG. 4 shows a block diagram of a circuit for driving a dimmable LED string according to the present invention having a load switch external to a power supply.

FIG. 4 shows a circuit for driving a dimmable LED string 10 according to the present invention. The circuit comprises a PWM control signal generator 6, a DC-to-DC switched-mode converter 7 including an enable switch 71, a battery pack 8, an output filter capacitor 9, an LED string 10 and an output load switch 13.

The output load switch 13 may comprise a configuration of bipolar transistors and is controlled by the PWM control signal such that it is synchronised with the PWM control signal (and thus also synchronised with the PWM output voltage signal). Therefore, when the PWM output voltage signal is at a maximum, the output load switch 13 allows current to pass and when the PWM output voltage signal is at a minimum, the output load switch 13 does not allow current to pass. When the PWM output voltage signal is at a minimum and the output load switch 13 does not allow current to pass, the capacitor 9 is isolated and cannot discharge through the LED string 10 but instead retains its charge. Therefore, the capacitor does not reform to its original shape. Subsequently, because the capacitor 9 is not continuously deforming and reforming at an audible frequency, no buzzing noise is emitted. Furthermore, when the PWM signal next becomes a maximum, the capacitor 9 is already charged and therefore the amount of current drawn through the inductor and other components of the DC-to-DC switched-mode converter 7 is reduced.

Figure 5:
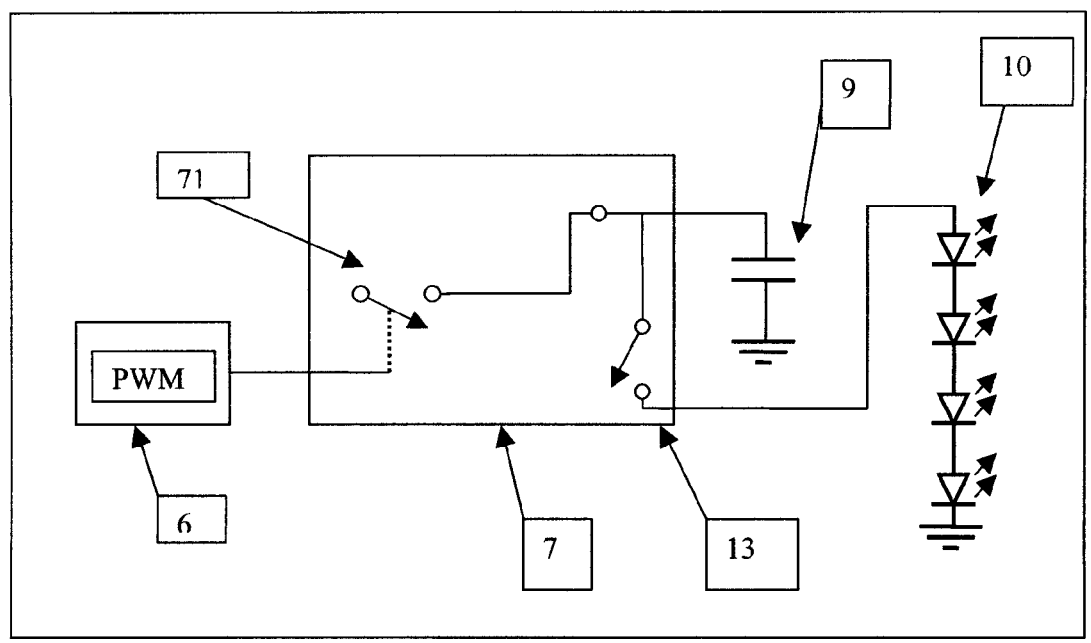
FIG. 5 shows a block diagram of a circuit for driving a dimmable LED string according to the present invention having a load switch internal to a power supply.

Alternatively, as shown in FIG. 5, the output load switch 13 may be integrated into a power supply integrated circuit which includes the DC-to-DC converter 7, such that the output load switch 13 provides a connection between an output voltage pin of the DC-to-DC converter 7, the output filtering capacitor 9, and a second pin, or pins, that connect to the LED string 10.

The present invention is also applicable in any DC supply technology that is disabled or powered off during the de-asserted state of a PWM signal waveform such that the output voltage is undriven in the OFF state; the voltage on the capacitor is the only determinant for when acoustical noise will be evident. Even in the case where a DC supply is the driving source, the output capacitor voltage fluctuation between the ON and OFF states is the source of the acoustical noise. Depending on whether current limiting is applied on start-up, the capacitor still appears as a very low impedance load when the power supply is re-enabled, which can cause inrush current spikes, as well. If the power supply is current-limited, the increased rise time of the voltage on the output capacitor causes significant non-linearity in the output voltage/current at low duty cycles of the PWM waveform.

Therefore, in addition to reducing acoustical noise problems, the present invention provides improved linearity of the PWM output current of the DC supply at low duty cycles.

The present invention also provides improved stability of operation of a DC-to-DC converter in cases where the load has a particularly large voltage discharge. In the above examples, this occurs particularly when the LED string 10 has a shorter second string.

The load switching element may be incorporated in a current or voltage control circuit to reduce the external component count and improve regulation of output current and voltage.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:
1. An apparatus comprising:
a voltage source for generating a pulse width modulated (PWM) output voltage signal;
a capacitor configured to filter the PWM output voltage signal; and
a switching element configured to be controlled by the PWM output voltage signal such that when the PWM output voltage signal is at a minimum, the switching element substantially prevents the capacitor from discharging and decouples the capacitor from a load,
where the apparatus is configured to drive a circuit element which comprises at least one light emitting diode (LED) and where the at least one LED is configured to emit light when the PWM output voltage signal is at a maximum and to not emit light when the PWM output voltage signal is at a minimum.

2. An apparatus according to claim 1, wherein the voltage source for generating the PWM output voltage signal comprises a DC-to-DC switched-mode converter configured to convert a supplied voltage level into a converted voltage level.

3. An apparatus according to claim 2, wherein the voltage source for generating the PWM output voltage signal further comprises a PWM control signal generator configured to output a PWM control signal to control the DC-to-DC switched-mode converter.

4. An apparatus according to claim 3, wherein the DC-to-DC switched-mode converter comprises an enable switching element, driven by the PWM control signal, and configured to control the output of the DC-to-DC switched-mode converter such that when the enable switching element is closed, the DC-to-DC switched-mode converter outputs the converted voltage level, and when the enable switching element is open, the DC-to-DC switched-mode converter does not output a voltage.

5. An apparatus according to claim 1, wherein the light emitted by the at least one light emitting diode is configured to illuminate the rear of a liquid crystal display (LCD) screen.

6. An apparatus according to claim 1, wherein the PWM signal is modulated to change the brightness of the light emitted by the at least one light emitting diode gradually.

7. An apparatus according to claim 1, wherein the switching element comprises two transistors.

8. An apparatus according to claim 1, wherein the capacitor comprises a ceramic capacitor.

9. A method comprising:
generating a pulse width modulated (PWM) output voltage signal;
filtering the PWM output voltage signal using a capacitor; and
controlling a switching element by the PWM output voltage signal such that when the PWM output voltage signal is at a minimum, the switching element substantially prevents the capacitor from discharging and decouples the capacitor from a load,
where the PWM output voltage drives at least one light emitting diode (LED) that emits light when the PWM output voltage signal is at a maximum, and does not emit light when the PWM output voltage signal is at a minimum.

10. A method according to claim 9, wherein generating the PWM output voltage signal comprises converting a supplied DC voltage level into a converted DC voltage level that is different from the supplied voltage level.

11. A method according to claim 10, wherein generating the PWM output voltage signal further comprises:
generating a PWM control signal using a PWM control signal generator; and
controlling a DC-to-DC switched-mode converter with the PWM control signal.

12. A method according to claim 11, wherein controlling the output of the DC-to-DC switched-mode converter comprises operating an enable switching element using the PWM control signal, such that when the enable switching element is closed, the converted voltage level is outputted by the DC-to-DC switched-mode converter, and when the enable switching element is open, no voltage is outputted by the DC-to-DC switched-mode converter.

13. A method according to claim 9, wherein filtering the PWM output voltage signal comprises filtering high frequency elements of the PWM output voltage signal.

14. A method according to claim 9, further comprising modulating the PWM control signal such that the brightness of the light emitted by the at least one LED appears to gradually change.

* * * * *